United States Patent
Masoner et al.

(10) Patent No.: US 7,162,923 B1
(45) Date of Patent: Jan. 16, 2007

(54) ADJUSTABLE FLOATING OPEN-WATER EVAPORATION PAN

(75) Inventors: Jason Robert Masoner, Tecumseh, OK (US); Scott Clemens Christenson, Edmond, OK (US)

(73) Assignee: The United States of America as represented by the Secretary of the Interior, Washington, DC (US)

( * ) Notice: Subject to any disclaimer, the term of this patent is extended or adjusted under 35 U.S.C. 154(b) by 135 days.

(21) Appl. No.: 11/122,202

(22) Filed: May 4, 2005

(51) Int. Cl.
   *G01F 15/00* (2006.01)
(52) U.S. Cl. .................................................. 73/290 R
(58) Field of Classification Search ............. 73/290 R, 73/291, 311, 40
   See application file for complete search history.

(56) References Cited

U.S. PATENT DOCUMENTS

| | | | | |
|---|---|---|---|---|
| 3,282,327 A | * | 11/1966 | Hardy et al. ............... | 159/47.1 |
| 3,987,677 A | * | 10/1976 | Alter .......................... | 73/19.03 |
| 4,470,544 A | * | 9/1984 | Bronicki et al. ............. | 239/2.1 |
| 5,551,290 A | * | 9/1996 | Spiegel ........................ | 73/311 |
| 5,734,096 A | * | 3/1998 | McGuigan et al. .......... | 73/49.2 |
| 6,532,814 B1 | * | 3/2003 | Bromley ...................... | 73/296 |
| 6,651,435 B1 | | 11/2003 | Johnston | |
| 7,004,011 B1 | * | 2/2006 | Spiegel ......................... | 73/40 |

* cited by examiner

*Primary Examiner*—Hezron Williams
*Assistant Examiner*—John Fitzgerald
(74) *Attorney, Agent, or Firm*—Mark Homer; Joan Gilsdorf

(57) ABSTRACT

An improved evaporation pan assembly having at least three float assemblies attached to the outer side wall of a circular shaped evaporation pan located in 120 degrees increments. An anchor assembly is included having a steel pole driven into the bed sediment. An open ring guide or a hollow, open-ended tube is attached to one of the three float assemblies and is intended to slip over the driven pole extending out of the water. Using this design, the floating evaporation pan may move freely around the anchor assembly due to wind, changes in stage, currents, etc., but still will maintain the pan in a level position upon the water body surface.

11 Claims, 1 Drawing Sheet

ADJUSTABLE FLOATING OPEN-WATER EVAPORATION PAN

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

This invention relates in general to measuring evaporation rates in bodies of water, more particularly to using evaporation pans to measure evaporation rates, and most particularly to evaporation pans employed within the body of water to measure evaporation rates.

2. Description of the Related Art

It is important for maintenance of wetlands and certain waterways to periodically obtain estimates of evaporation for these open waters. Most often the biggest source of error in a lake, wetland, or lagoon is the estimate of evaporation. Currently, there are numerous methods of obtaining such estimates of evaporation. One inexpensive method is to put water in an evaporation pan near the water body being evaluated. As the water evaporates from the pan, measurements are taken to determine the evaporation rate.

However, there are several problems associated with obtaining accurate evaporation rates using this method. First, due to the pan being placed on land, the water temperature within the pan could be far greater than the water temperature in the water body being evaluated, causing evaporation to be over estimated. Second, vegetation, wind patterns, soil type, and moisture content on land also greatly affect evaporation rates.

One method developed to alleviate these problems is to place the evaporation pan in the actually water body being measured by placing the pan on a raft anchored with ropes tied to land or weights placed in bed sediment. However, accuracy problems still exist using this method. Because the raft is normally constructed of wood or plastic, these materials absorb heat and transfer the heat to the pan/water, raising the water temperature in the pan to above that of the water body. Also, the raft raises the pan so the water level in the pan is much higher than the water body being evaluated, again, potentially affecting the evaporation rate determination. Still further, attaching a rope to one side of the raft has a tendency to make the raft tilt in one direction, causing the pan and water to be tilted, yet again, potentially affecting the evaporation rate results.

Therefore, it is desired to provide an apparatus and method to obtain a more accurate evaporation rate in open bodies of water that is inexpensive and easily deployed in the field.

SUMMARY OF THE INVENTION

The invention proposed herein comprises a floating evaporation pan that can be adjusted so that the level of water in the pan is at the same level as that in the body of water being measured. In this manner, one can provide evaporation estimates that closely approximates the conditions of the body of water being evaluated, increasing the accuracy of the evaporation rate determination.

Accordingly, it is an object of this invention to provide an improved evaporation pan assembly that allows for a more accurate evaporation rate calculation than current evaporation pans.

It is a further object of this invention to provide an improved evaporation pan assembly that maintains a reasonable cost compared to current evaporation pans.

This invention meets these and other objectives related to measuring evaporation rates in open bodies of water by providing an improved evaporation pan assembly comprising at least three float assemblies located every 120 degrees on the outer side wall of the pan. An anchor assembly consist of a steel pole driven into the bed sediment and a ring guide attached to one of the three float assemblies. The ring guide slips over the driven steel pole. This design allows the floating evaporation pan to move freely in a circular path around the anchor assembly due to wind currents. This allows the pan to maintain a level position upon the water body surface and will allow the pan to raise and fall with the larger body of water due to precipitation events and/or discharge events. A user may fill the floating evaporation pan with water to a desired height in the pan. Depending upon the buoyancy provided by the floats, water or sand can be added inside the float assemblies so that water levels inside the pan can be set equal to the surface of the body of water being evaluated. Because the rate of the evaporation in the pan will be, basically, equivalent to the body of water, the water level in the pan should remain substantially equal to that of the surface of the body of water. Thus, an extremely accurate measurement of the evaporation rate within the body of water may be obtained.

BRIEF DESCRIPTION OF THE DRAWINGS

The accompanying drawing, which is incorporated in and constitutes a part of the specification, illustrates an embodiment of the invention, and, together with the description, serves to explain the principles of the invention.

DESCRIPTION OF PREFERRED EMBODIMENTS

Figure 1:
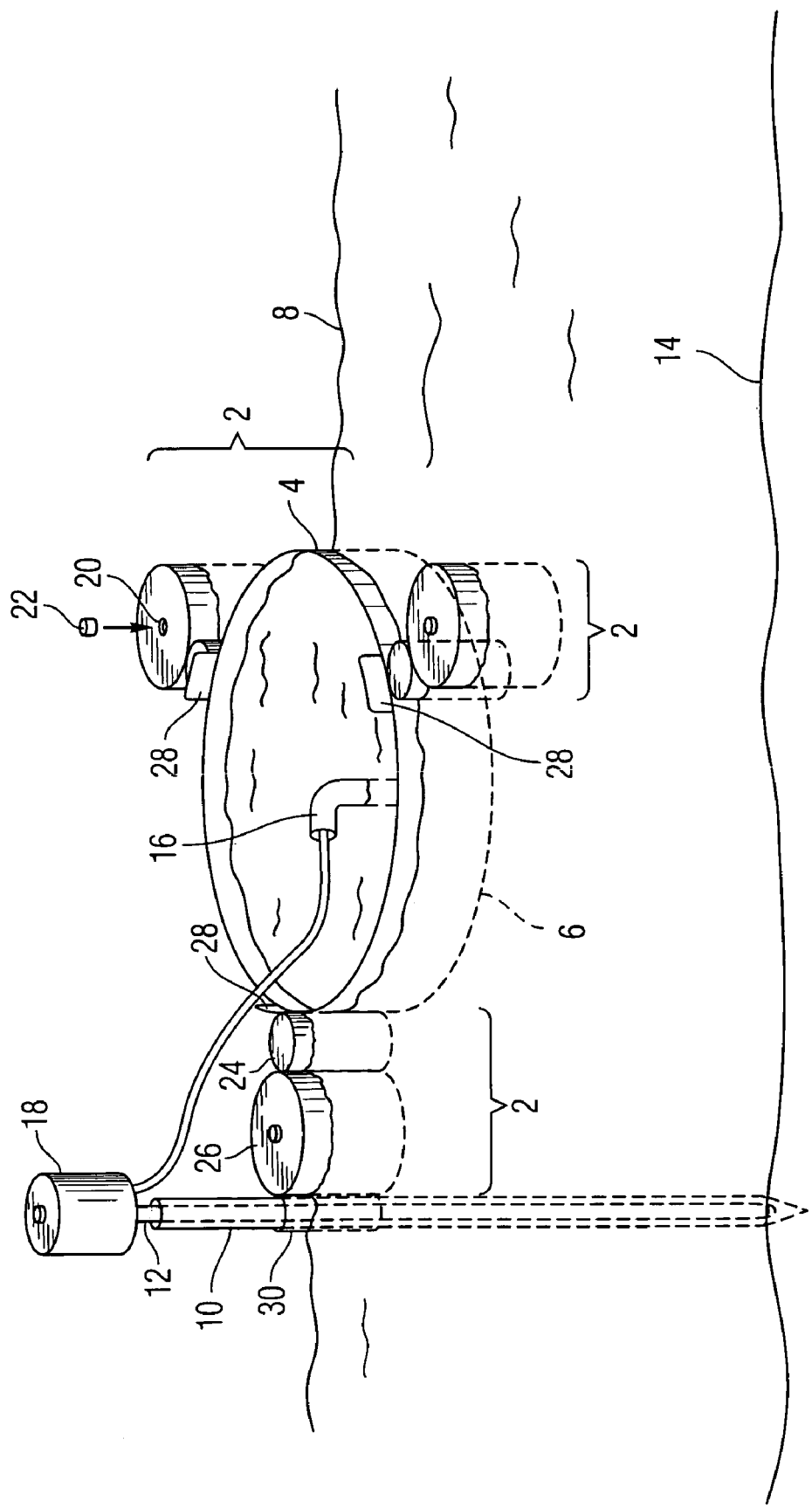
FIG. 1 is an angled view of an embodiment of the invention.

The invention, as embodied herein, comprises an improved evaporation pan assembly. At least three float assemblies are attached at 120 degrees increments to the outer walls of a container ("evaporation pan" hereinafter) allowing the evaporation pan to float in a body of water in which evaporation is to quantified. The buoyancy provided by the three float assemblies is calculated so that the floating evaporation pan will never sink (barring any holes or leaks to floats). This extra buoyancy provided by the floats causes the water level in the pan to be higher than the surrounding body of water being evaluated. The floats are designed so that weight (water or sand) can be added inside the floats so that water levels inside the pan can be set equal to the surface of the body of water being evaluated. Because the evaporation pan is actually within the body of water being evaluated and water levels inside and outside the pan are equal, the water within the pan is subjected to the same environmental conditions as the body of water being evaluated. Therefore, the evaporation rate within the pan should be substantially equal to the evaporation rate at the surface of the body of water.

An anchor assembly is included which anchors the evaporation pan, but allows for level movement of the pan due to conditions such as wind, currents, etc. A rigid post is driven into the bed sediment. A ring guide on one of the floats slips over the post so that the floating evaporation pan may float freely around the post as wind and currents dictate. This anchoring design allows the pan to maintain a level position upon the water body surface and will allow the pan to raise and fall with the larger body of water due to precipitation events and/or discharge events.

Referring to FIG. 1, there are at least three float assemblies 2 attached at 120 degrees around the outer walls of the evaporation pan. Preferably, each float assembly 2 consist of two floats 24, 26, although the invention can operate if the float assembly 2 comprise one float. The inner float 24 attached to the outer walls 4 of an evaporation pan 6. The attachment point between the floats 24 and the walls 4 is determined to maintain the evaporation pan 6 in a level position in relation to the surface 8 of the body of water being evaluated. Thus, if three float assemblies 2 are employed, they would be positioned substantially equidistant from each other around the periphery of the evaporation pan 6.

An anchor assembly 10 is used to maintain the evaporation pan 6 position within the body of water. The anchor assembly 10 comprises a rigid post 12 that is driven into the bed sediment 14 of the body of water. The post 12 is rotationally attached to one of the floats 2, so that the evaporation pan 6 may rotate about the post 12 if pushed by conditions such as wind or current. The attachment point between the post 12 and the float assembly 2 preferably is substantially opposite to the point of attachment between the float assembly 2 and the pan 6 to ensure an even, balanced rotation.

In a preferred embodiment, a stilling well 16 is attached to the bottom of the evaporation pan 6. A stilling well 16 is a tube-like fixture with a small opening in the bottom of the tube hydrologicaly connecting water inside the stilling well to water outside the stilling well, allowing the water level inside the stilling well 16 to be equal to the water level inside the pan 6. The stilling well 16 dampens small pressure waves created by environmental conditions that might affect the accuracy of an evaporation rate calculation. If a stilling well 16 is employed in the present invention, a measurement device 18 would be inserted into the well 16 to measure the level of water within the well 16. These devices are known in the art and include a pressure transducer, float and shaft encoder, or a staff gauge. The stilling well 16 may be constructed of any material that withstands water, such as PVC pipe.

Optionally, splash guards 28 may be employed between the float assemblies 2 and the evaporation pan 6 in order to ensure that water does not splash from the surface 8 into the evaporation pan 6. These guards 28 would extend above the top of the float assemblies 2 and the upper lip of the evaporation pan 6 and would preferably be made of a material similar to the float assemblies 2 or pan 6.

The evaporation pan 6 should be constructed of a material that is water resistant and does not unduly reflect or absorb sunlight, for example stainless steel. The size and shape of the evaporation pan 6 may be selected by one skilled in the art, but a preferred evaporation pan 6 is a modified class A United States Weather Service ET Pan that is circular in shape, has a 47 inch diameter, and is 10 inches deep with an open top. The circular shape of this preferred evaporation pan assists in floating stability for the present device.

The float assemblies 2 may be any size, shape, or material such that they provide sufficient buoyancy to allow the evaporation pan 6 to float on the surface 8 of the body of water being evaluated when the selected amount of water is placed within the pan 6. In a preferred embodiment, the float assemblies 2 comprise at least a portion that is hollow. An opening 20 at the top of the floats 26 allow a user to add a material or substance to the hollow portion of the floats 26. By adding a material to the floats 26, this allows the buoyancy to be adjustable, without interchanging floats. Any easily accessible material may be input into the hollow of the floats, with water being preferred due to its weight and proximity. A cap or plug 22 may be inserted into the opening 20 after a desired amount of the material is inserted into the floats 26.

In a preferred embodiment, the floats 24, 26 will be enclosed, hollow stainless steel cylinders that comprise a height equivalent to the height of the evaporation pan 6. In a most preferred embodiment, the invention comprises three float assemblies 2 attached to the outer wall 4 of the evaporation pan 6 at about 120 degrees from each other. The float assemblies 2 are made up of two enclosed stainless steel cylinders. A six inch diameter cylinder 24 attached to the evaporation pan 6 and a 12 inch diameter cylinder 26 attached to the six inch diameter cylinder at a point opposite of the attachment to the evaporation pan 6. The opening 20 is positioned on the top of the 12 inch diameter cylinder 26. This configuration of the invention provides excellent balance and stability for use in most open water systems.

The anchor assembly 10 may also be made of numerous materials. The central post 12 must merely be constructed of a rigid material that has sufficient strength to maintain its position when driven into the bed 14 of the body of water and supporting the weight of the floating evaporation pan 6 and float assemblies 2. In a preferred embodiment a three-quarter inch steel rod may be used. To provide the rotational attachment from the anchor assembly 10 to one of the float assemblies 2, an open-ended hollow cylinder 30 may be placed over the central post and attached to the float 2. Preferably, the hollow cylinder 30 may be made of a plastic material. In another embodiment of the invention, a ring may be attached to one of the float assemblies 2 and placed over the central post.

In describing attachments between the elements herein, any known method of attaching the elements may be employed by one skilled in the art. Examples of attachment methods include the use of drilling holes and employing screws and bolts, using pins and/or adhesives, or using welding techniques.

In operation, the invention described herein would be used as follows. The central post 12 would be imbedded into the bottom of the water body being evaluated. The hollow cylinder 30 is placed over the central post 12. One of the float assemblies 2, attached to the evaporation pan 6 is attached to the hollow cylinder 30. An amount of water is added to the evaporation pan 6 from the surface 8 of the body of water. If necessary, to adjust the buoyancy of the evaporation pan 6 so that the water level inside the pan 6 is at the same height as the surface 8, water is added through the openings 20 of the float assemblies 2. When the desired height is achieved, the plugs 22 are placed into the openings 20. Finally, at certain time intervals, selected by one skilled in the art, the water level is determined in the pan, providing the information necessary to calculate the evaporation rate of water in the body of water.

What is described are specific examples of many possible variations on the same invention and are not intended in a limiting sense. The claimed invention can be practiced using other variations not specifically described above.

What is claimed is:

1. A device for determining the evaporation rate of an open body of water, comprising:
    an open container;
    at least three float assemblies attached to outer walls of the open container; and,
    an anchor assembly, attached to a bed of the open body of water and rotationally attached to one of the at least three float assemblies.

2. The device of claim 1, comprising three float assemblies attached to outer walls of the container, spaced substantially equidistant from each other.

3. The device of claim 2, wherein the floats comprise:
    an inner circular float having a first diameter attached to the open container; and,
    an outer circular float having a second diameter, greater than the first diameter, attached to the inner circular float.

4. The device of claim 3, wherein the pan comprises a circular shape.

5. The device of claim 4, further comprising splash guards on a lip of the open container adjacent to the inner circular floats.

6. The device of claim 5, further comprising a stilling well attached to an inner bottom of the open container.

7. The device of claim 6, wherein the anchor assembly comprises a rigid rod surrounded by an open ended cylinder.

8. A method of determining the rate of evaporation of an open body of water, comprising the steps of:
    providing an evaporation pan;
    attaching a plurality of floats to an outer edge of the evaporation, the floats being substantially equidistant from each other;
    attaching an anchor assembly to a bed of the open body of water and rotationally to one of the plurality of floats;
    filling the evaporation pan with water to a level substantially equal to a level of water in the body of water; and,
    measuring the level of water in the pan at selected time intervals.

9. The method of claim 8, wherein the attaching step comprises three floats.

10. The method of claim 9, wherein the floats comprise an inner circular float having a first diameter attached to the open container, and, an outer circular float having a second diameter, greater than the first diameter, attached to the inner circular float.

11. The method of claim 10, further comprising the step of attaching a stilling well to the evaporation pan before the filling step.

* * * * *